United States Patent
Kumar A V et al.

(10) Patent No.: US 9,934,175 B2
(45) Date of Patent: Apr. 3, 2018

(54) DIRECT MEMORY ACCESS FOR PROGRAMMABLE LOGIC DEVICE CONFIGURATION

(71) Applicant: Xilinx, Inc., San Jose, CA (US)

(72) Inventors: Anil Kumar A V, Hyderabad (IN); Bokka Abhiram Sai Krishna, Hyderabad (IN)

(73) Assignee: XILINX, INC., San Jose, CA (US)

( * ) Notice: Subject to any disclaimer, the term of this patent is extended or adjusted under 35 U.S.C. 154(b) by 206 days.

(21) Appl. No.: 14/876,467

(22) Filed: Oct. 6, 2015

(65) Prior Publication Data

US 2017/0097910 A1    Apr. 6, 2017

(51) Int. Cl.
G06F 13/00 (2006.01)
G06F 13/28 (2006.01)
G06F 13/42 (2006.01)
G06F 13/40 (2006.01)

(52) U.S. Cl.
CPC ............ *G06F 13/28* (2013.01); *G06F 13/404* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 7,139,848 B1 | 11/2006 | Murray et al. | |
| 7,500,046 B1 * | 3/2009 | Puri | G06F 11/277 710/305 |
| 7,536,669 B1 | 5/2009 | Anderson | |
| 7,581,076 B2 * | 8/2009 | Vorbach | G06F 1/24 710/52 |
| 7,912,997 B1 * | 3/2011 | Murray | G06F 13/28 710/22 |
| 8,352,898 B1 | 1/2013 | Kellermann | |
| 8,527,949 B1 * | 9/2013 | Pleis | G06F 15/7867 717/121 |
| 8,598,908 B1 * | 12/2013 | Sullam | G06F 13/385 326/41 |
| 9,037,807 B2 * | 5/2015 | Vorbach | G06F 15/7867 711/147 |

(Continued)

OTHER PUBLICATIONS

Xilinx, Inc., "LogiCORE IP AXI DMA v6.03a Product Guide," PG021, Dec. 18, 2012, pp. 1-117, Xilinx, Inc., San Jose, California, USA.

*Primary Examiner* — Michael Sun
(74) *Attorney, Agent, or Firm* — LeRoy D. Maunu

(57) ABSTRACT

Using a storage interface circuit of a programmable IC, a first set of configuration data can be communicated between a storage circuit and the programmable IC. Using the first set of configuration data, the programmable IC can be programmed to include: a bus interface module that is designed to interface with a host device over a communication bus that links multiple devices, and an internal configuration access interface that is designed to interface between the bus interface module and programmable logic of the programmable IC. Using direct memory access (DMA) transfers through the bus interface module, a second set of configuration data can be communicated between a memory circuit and the programmable IC. Using the second set of configuration data, the programmable logic of the programmable IC can be programmed.

20 Claims, 6 Drawing Sheets

(56) References Cited

U.S. PATENT DOCUMENTS

| | | | | |
|---|---|---|---|---|
| 9,213,485 B1* | 12/2015 | Hayes | ............... | H04L 49/10 |
| 9,330,058 B2* | 5/2016 | Master | ............... | G06F 15/80 |
| 2011/0191506 A1* | 8/2011 | Srinivasan | ............... | G06F 3/00 |
| | | | | 710/22 |
| 2016/0203096 A1* | 7/2016 | Arbel | ............... | G06F 13/28 |
| | | | | 710/106 |

* cited by examiner

DIRECT MEMORY ACCESS FOR PROGRAMMABLE LOGIC DEVICE CONFIGURATION

TECHNICAL FIELD

The disclosure generally relates to configuration of programmable logic devices, and more particularly to configuration of programmable logic devices using direct memory access transactions.

BACKGROUND

There are a variety of different applications that can use memory circuits including, but not limited to, programmable logic devices (PLDs). PLDs are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay locked loops (DLLs), bus or network interfaces such as Peripheral Component Interconnect Express (PCIe) and Ethernet, and so forth.

Each programmable tile can include both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are often programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

As the size of the configuration data used to program PLDs increases, the time required to load the configuration data can increase. Thus, the time before the PLD is fully-configured and operational can increase. This can be problematic in instances where it is desirable to have the PLD be available quickly, whether upon power-up or in similar situations. These and other problems can be problematic for PLD design and their use.

SUMMARY

Certain implementations are directed toward a method for configuring a programmable integrated circuit (IC). The method includes communicating, using a storage interface circuit of the programmable IC, a first set of configuration data between a storage circuit and the programmable IC. Using the first set of configuration data, the programmable IC is configured such that it includes: a bus interface module that is designed to interface with a host device over a communication bus that links multiple devices, and an internal configuration access interface that is designed to interface between the bus interface module and programmable logic of the programmable IC. Using direct memory access (DMA) transfers through the bus interface module, a second set of configuration data is communicated between a main memory circuit and the programmable IC. Using the second set of configuration data, the programmable logic of the programmable IC is configured.

According to certain implementations, a system includes a programmable integrated circuit (IC). The programmable IC includes a first interface circuit connected to a storage circuit and configured to receive configuration data from the storage circuit and a second interface circuit connected to a communication bus that links multiple devices. The storage circuit stores a first set of configuration data that, upon loading into the programmable IC through the first interface circuit, is configured to create: a bus interface module that is designed to interface with a host device over the communication bus, an internal configuration access interface that is designed to interface between the bus interface module and programmable logic of the programmable IC; and a direct memory access (DMA) module that is designed to communicate, using direct memory access (DMA) transfers through the bus interface module, a second set of configuration data between a main memory circuit and the programmable IC.

In certain implementations, a system includes a programmable integrated circuit (IC) that includes: a first interface circuit connected to a storage circuit and configured to receive configuration data from the storage circuit; and a second interface circuit connected to a communication bus that links multiple devices. The system includes the storage circuit, which stores a first set of configuration data that, upon loading into the programmable IC through the first interface circuit, is configured to create: a bus interface module that is designed to interface with a host device over the communication bus, and an internal configuration access interface that is designed to interface between the bus interface module and programmable logic of the programmable IC. The system also includes a host device having a direct memory access (DMA) engine that is designed to communicate, using direct memory access (DMA) transfers and through the bus interface module, a second set of configuration data between a main memory circuit and the programmable IC.

Other features will be recognized from consideration of the Detailed Description and Claims, which follow.

BRIEF DESCRIPTION OF THE DRAWINGS

Various aspects and features of the method, device, and system will become apparent upon review of the following detailed description and upon reference to the drawings in which.

DETAILED DESCRIPTION

Figure 1:
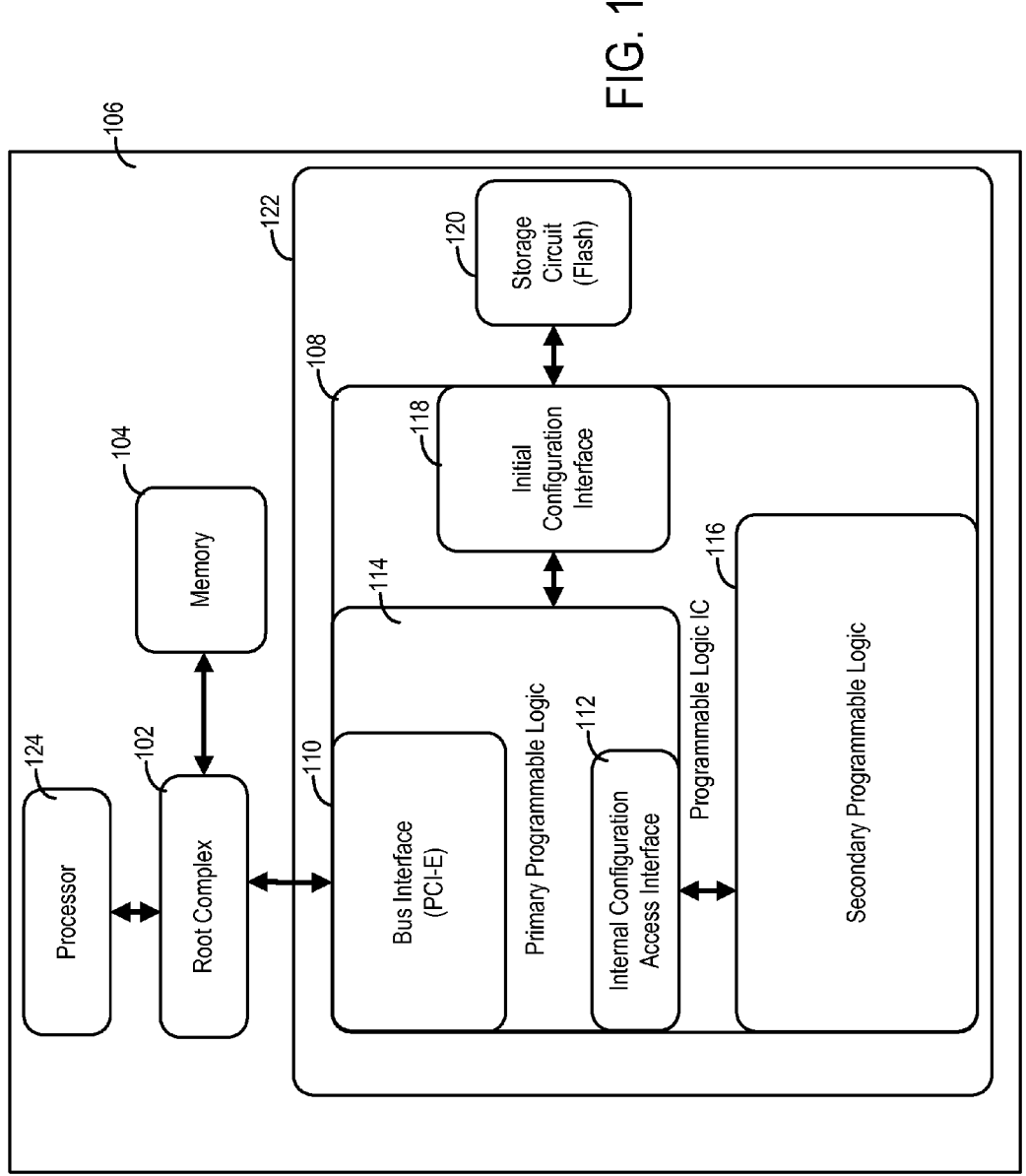
FIG. 1 depicts a block diagram of a system for transferring configuration data using DMA, consistent with certain implementations.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Various implementations are directed toward a system that is configured to split the loading of configuration data (sometimes referred to as a configuration "bitstream") for a programmable IC (sometimes referred to as a PLD IC), into two different stages. Splitting the loading into two different stages can allow for the programmable IC to meet time-to-availability requirements during configuration. Moreover, the transfer for second stage configuration data can be facilitated using direct memory access (DMA) transfers, as discussed in more detail herein. DMA transfers involve access to main memory used by a central processing unit (CPU) that is independent of the CPU (e.g., without individual read or write commands from the CPU to the main memory and to the PLD IC). For example, the CPU can execute device driver software that sends a memory access command to a DMA engine, which then takes care of accessing main memory and transferring the accessed data to the programmable IC.

In certain implementations, the first stage can contain sufficient configuration data to establish a bus interface module that is designed to interface with a host device over a communication bus that links multiple devices together. An internal configuration access interface can also be included to provide an interface between the bus interface module and programmable logic of the programmable IC. The system is configured to then load the remaining configuration data using DMA transfers through the bus interface module. In this manner, the second set of configuration data can be moved directly between a main memory circuit and the programmable IC with low CPU utilization. The programmable logic of the PLD can then be further configured using the second set of configuration data.

According to various implementations, the bus interface module can be configured to communicate using a high speed serial bus protocol that is based upon a point-to-point topology and a packet-based protocol. A point-to-point topology can use a number of dedicated connections between devices, while a shared bus topology can use connections that are shared with three or more devices. Packet-based communication protocols allow for data to be transmitted in separate (small) blocks to a destination specified in each packet. As might be necessary, the packets for a particular communication stream can be reassembled upon receipt at the destination.

A particular example of a point-to-point topology that uses packets is Peripheral Component Interconnect Express (PCIe). For ease of discussion, various implementations will be discussed in the context of PCIe; however, it is understood that other protocols, topologies, and configurations are also possible.

In certain implementations, the size of the configuration data for the first stage is kept small enough to meet an initial, desired configuration timing. For instance, the PCIe specification includes a requirement that PCIe compliant endpoint devices meet a 100 ms boot time. In various instances, the first set of configuration data can be stored in a memory circuit that is accessible over a default/configuration interface of the programmable IC (PLD/FPGA). This interface can be implemented using circuitry in the programmable IC that is available upon power-up and without first being configured. For instance, the first set of configuration data can be stored in a persistent memory circuit, such as a flash memory circuit. Accordingly, the size of the configuration data for the first stage can be kept small enough to allow the configuration data to be loaded using the hard interface and the programmable IC to be configured to be available on the bus within the desired time (e.g., 100 ms).

Consistent with certain implementations, the programmable IC can include an internal configuration access interface that is designed to interface between the bus interface module and programmable logic of the programmable IC. This internal configuration access interface can be integrated with the bus interface to provide access to the configuration logic of the programmable IC. While, in some instances, the internal configuration access interface can be configured to transfer the second stage configuration data using configuration memory writes (controlled by a device driver) to the programmable IC. The configuration data is written in many different write commands that each originate with the CPU. The write commands can use valuable host processor time and can still take a significant amount of time to complete the entire data transfer. Particular aspects of various implementations are directed toward a system that is configured to use DMA transfers for the second stage transfer, as opposed to using configuration memory writes of similar mechanisms. This can be particularly useful for reducing, or eliminating, the processor load and for increasing the speed of second stage transfer.

Turning now to the figures, FIG. 1 depicts a block diagram of a system for transferring configuration data using DMA, consistent with certain implementations. The system 106 can include an (PCIe) endpoint card 122, which can have a programmable IC 108 that is configured to load a first stage of configuration data from a storage circuit 120. Storage circuit 120 can be implemented as a PROM (programmable read-only memory), flash memory, or another type of memory circuit. An initial (storage) configuration interface 118 can be configured to retrieve the configuration data from the storage circuit 120 in order to configure a first portion of the programmable logic of the programmable IC.

As discussed herein, the data transfer rate for the initial configuration process can be insufficient to transfer all of the configuration data for a programmable IC within a desired time (e.g., 100 ms for a PCIe endpoint device). Thus, the configuration data can be partitioned into two or more stages to allow for configuration of corresponding logic at different times. For instance, a first stage of configuration data can include data for configuring a portion of the programmable logic identified as primary programmable logic 114. Primary programmable logic 114 can include, but is not necessarily limited to, a bus interface module 110 and an internal configuration access interface 112. In certain implementations, the bus interface module 110 can be configured to use a point-to-point link with a host device that includes a root complex 102, a processor circuit 124 and memory circuit 104. In particular implementations, the point-to-point link uses the PCIe protocol to communicate with the host device via the root complex 102.

Memory circuit 104 can store (secondary) configuration data for configuring secondary programmable logic 116. This secondary configuration data can be accessed using the bus interface module 110 using DMA transfers. For a PCIe protocol, the DMA transfers can be facilitated by using root complex 102 as a DMA-capable bus master that directly accesses the memory circuit 104. In particular implementations and as explained in more detail herein, the host device can function as the root complex device of a PCIe device tree. The DMA transfers can also be facilitated by designing the bus interface module 110 with a DMA engine that allows the bus interface module 110 to serve as a bus master that implements DMA transfers to the memory circuit 104. Device driver software can facilitate the DMA transfers by configuring and identifying physical addresses for buffers used for the DMA transfers. In the PCIe context, this can include identifying and using BAR-mapped register(s) of the bus interface module 110.

Figure 2:
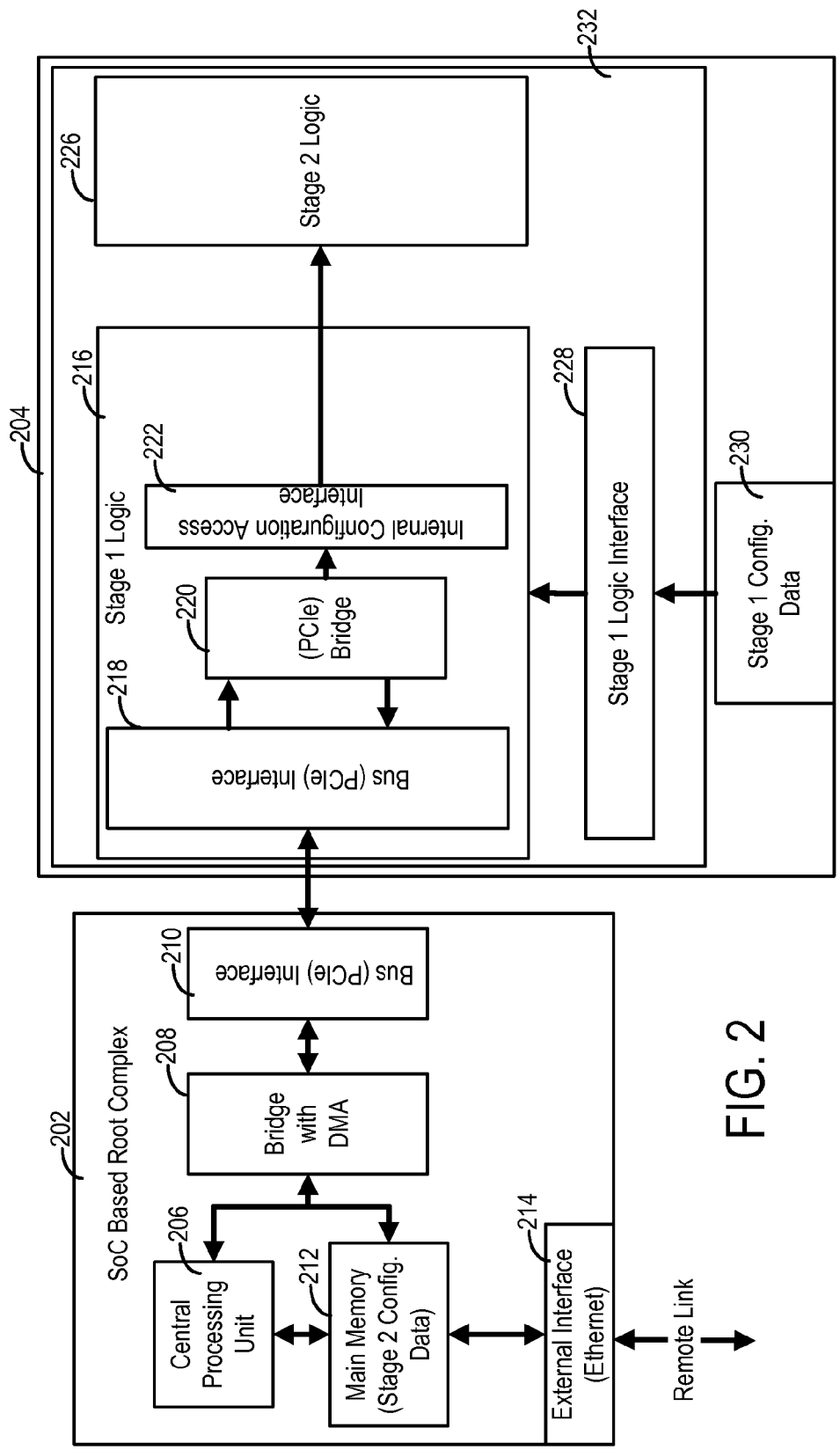
FIG. 2 depicts a block diagram of a system with a system-on-chip (SoC) used as a root complex that includes DMA capabilities, consistent with implementations discussed herein.

FIG. 2 depicts a block diagram for a system with a system-on-chip (SoC) used as a root complex that includes DMA capabilities, consistent with implementations discussed herein. A (PCIe) endpoint card 204 can include a programmable IC (FPGA) 232. The programmable IC 232 can include a stage 1 (programmable) logic interface 228. Stage 1 logic interface 228 can be designed to access and load stage 1 configuration data for the purpose of configuring stage 1 logic 216. Upon initialization (e.g., power-on) of the programmable IC 232, the stage 1 logic interface begins retrieving the stage 1 configuration data 230. The stage 1 configuration data can be stored in the programmable IC 232 (e.g., as internal non-volatile memory) or on a separate IC 230 (e.g., as an external non-volatile memory circuit). The size of the stage 1 configuration data can be kept relatively small, so as to allow for the loading and subsequent configuration to be carried out within a predetermined time (e.g., 100 ms for PCIe).

After configuration of the corresponding programmable logic, stage 1 logic 216 can include a bus interface module 218, which can be configured to use, for example, PCIe. The stage 1 logic 216 can also be configured to include a stage 2 internal configuration access interface 222 between the bus interface module 218 and the programmable logic. Data received over the two interfaces can then be used to program stage 2 logic 226. In some instances, a bridge 220 can be implemented between the bus interface module 218 to provide an interface between communication protocols that are used on either side of the bridge. A PCIe interface 210 can be configured to communicate with the bus interface module 218.

In some implementations, SoC 202 can be configured to function as a host device with a PCIe root complex of the system. A CPU 206 can be configured to access main memory 212 during normal operation. Main memory 212 can also be configured to be accessible by bridge 208, which includes a DMA engine that is configured to use DMA transactions to main memory 212. This can allow the SoC 202 to retrieve stage 2 configuration data directly from the main memory without burdening the CPU 206 with read and write requests to the main memory and other devices.

According to some implementations, the stage 2 configuration data can be provided from an external interface 214 (e.g., using Ethernet). In particular implementations, the stage 1 logic 216 can be configured to allow for reconfiguration of the stage 2 logic 226. Accordingly, the programmable IC 232 could be configured to allow remote upgrades to the stage 2 logic 226. For example, the stage 1 logic 216 can be configured to respond to a particular communication by (re)entering a configuration mode during which stage 2 configuration logic is received using DMA transfers. The stage 2 logic 216 can then be configured according to the newly-received configuration data.

Figure 3:
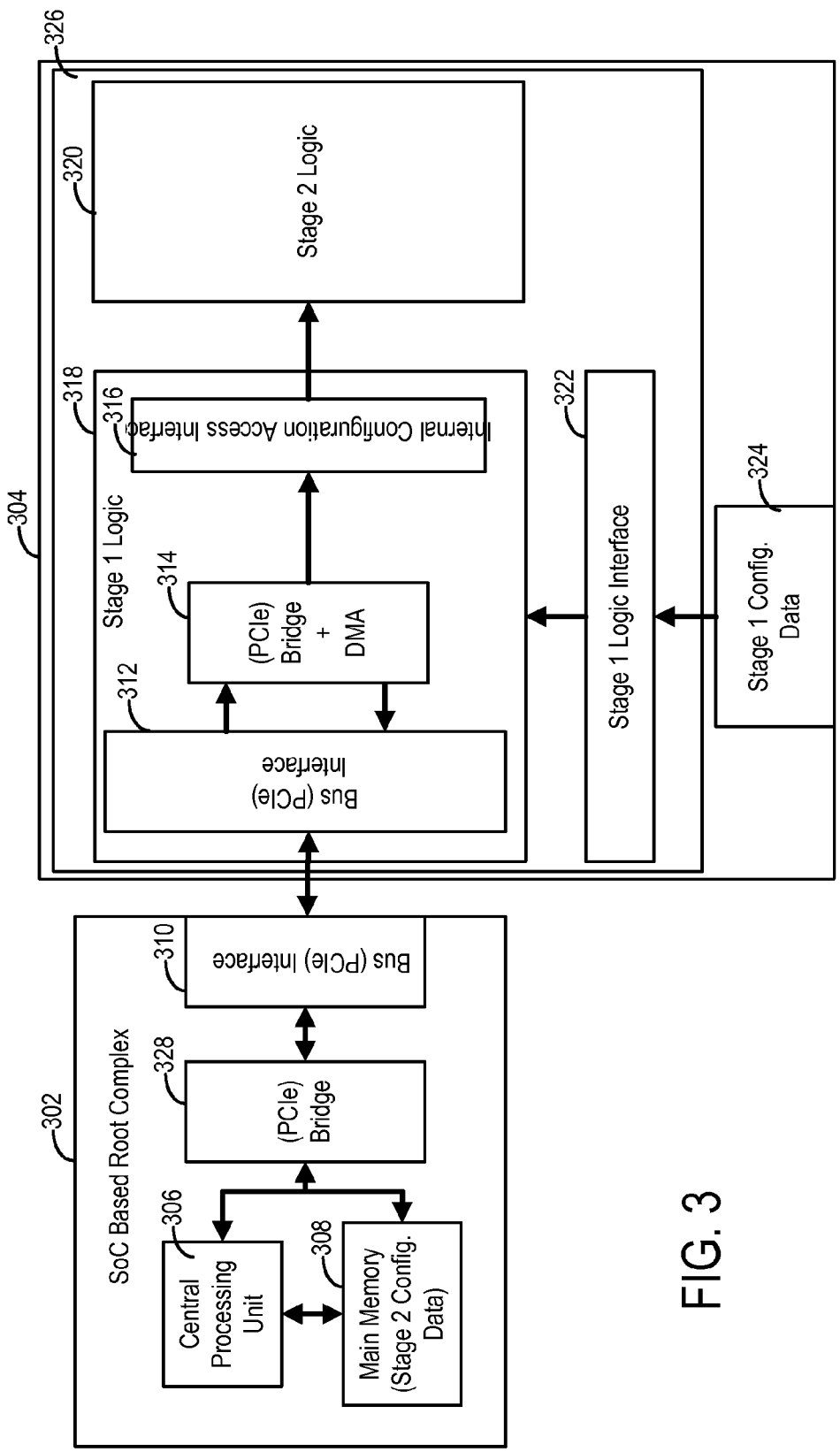
FIG. 3 depicts a block diagram of a system with stage 1 logic configured with DMA capabilities in the PCIe endpoint, consistent with implementations discussed herein.

FIG. 3 depicts a block diagram for a system with stage 1 logic configured with DMA capabilities, consistent with implementations discussed herein. Similar to the discussion in FIG. 2, (PCIe) endpoint card 304 can include a programmable IC 326. The programmable IC 326 can include a stage 1 (programmable) logic interface 322. The stage one programmable logic interface 322 can be designed to access and load stage 1 configuration data 324 for the purpose of configuring stage 1 (programmable) logic 318. Upon initialization (e.g., power-on) of the programmable IC 326, the stage 1 logic interface 322 begins retrieving the stage 1 configuration data 324. The stage 1 configuration data 324 can be stored on the programmable IC 326 (e.g., as internal non-volatile memory) or on a separate IC (e.g., as an external non-volatile memory IC). The size of the stage 1 configuration data 324 can be kept relatively small, so as to allow for the loading and subsequent configuration to be carried out within a predetermined time (e.g., 100 ms for PCIe).

After configuration of the corresponding programmable logic, stage 1 logic 318 can include a bus interface module 312, which can be configured to use, for example, PCIe. The stage 1 logic 318 can also be configured to include an internal configuration access interface 316 between the bus interface module 312 and the remaining programmable logic, which can then be used to program stage 2 logic 320. Bridge 314 can be designed to provide an interface between communication protocols that are used on either side of the bridge and also to function as a DMA engine that can function as a bus master for the purposes of initiating DMA transfers from main memory. Bridge 328 can be designed to provide a similar interface on the SoC 302.

According to certain implementations, the DMA configuration registers can be mapped to any BAR (Base Address Register) of PCIe End Point and the host CPU can access those registers through the BAR. In this manner, the SoC 302 does not need to be configured to provide the functionality of a DMA engine. The stage 1 logic 318 can be configured to directly access the main memory circuit 308 through bus (PCIe) interface module 310 independently from the CPU 306.

Consistent with various implementations, the DMA engine can be configured and managed by a software device driver. For instance, the device driver can generate commands that are sent to the DMA engine and that relate to a memory mapping for a particular memory region relative to the operating system being used. This command can be, for example, a read command with source-address, destination-address, and length. This can be done by configuring the DMA engine with the required information through BARs. The DMA engine can be setup by a software driver to carry out the DMA transfers for a task associated with the second stage configuration data.

Depending on the size of the second configuration data and also the number of bytes the DMA engine can transfer in one transaction, the device driver will setup DMA to transfer the configuration data in multiple chunks. The configuration data can be scattered in the host PC main memory and the DMA can therefore be setup appropriately by the software driver so that it can fetch the configuration data from the different locations.

Figure 4:
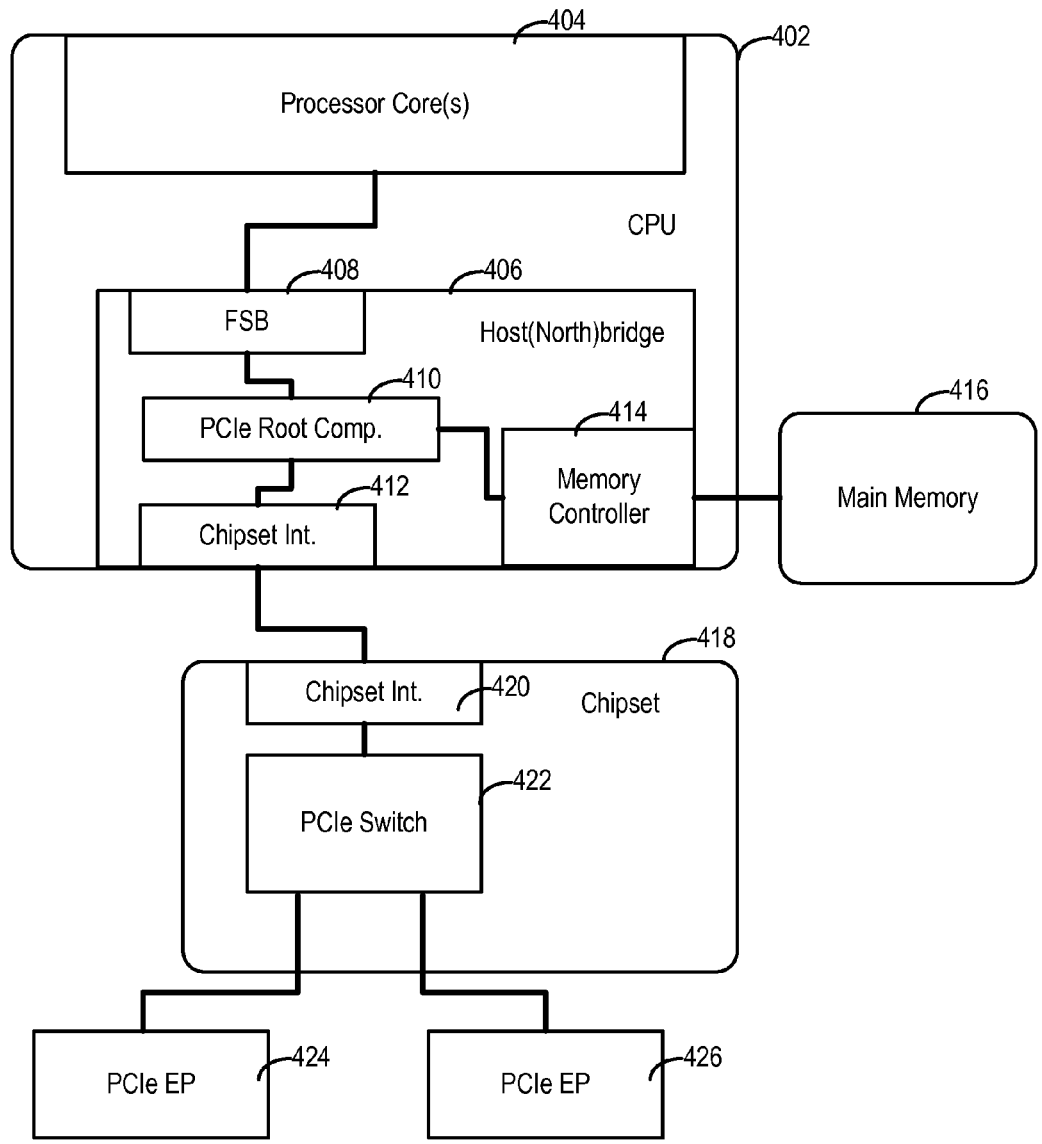
FIG. 4 depicts a system diagram of a computer system with PCIe components, consistent with various implementations.

FIG. 4 depicts a system diagram of a computer system with PCIe components, consistent with various implementations. CPU 402 includes one or more processor cores 404. A host bridge 406 (sometimes referred to as North Bridge) facilitates communications between the processor cores and other system components and includes a front-side bus (FSB) module 408 that provides an interface to the processor cores. The host bridge 406 can be configured to function as the PCIe root complex (device/module) 410. The PCIe root complex 410 connects the PCIe device tree to main memory 416, the processor cores 404, and to other devices, such as a graphics processing unit (GPU) (not shown). While the root complex can be implemented as part of a separate physical chip from the CPU, the root complex can also be integrated into the CPU chip. Main memory 416 can be accessed using a memory controller circuit 414.

In some implementations, a chipset interface module 412 can be used to communicate with the chipset 418 using a different communication protocol (e.g., a proprietary chipset protocol). A corresponding chipset interface module 420 can provide an interface between the chipset-specific communication protocol and one or more PCIe switches 422. A number of PCIe endpoint (EP) devices 424, 426 can be accessible through the PCIe switch. Each PCIe EP can be connected to the PCIe switch through a dedicated high-speed serial connection. In this manner, the system is configured using a point-to-point topology. Moreover, data can be transmitted using a packet-based protocol. For example, the CPU can execute a software driver that encapsulates data in a set of packets that specify a destination address that corresponds to a PCIe EP. The root complex, and each subsequent module in the transmission path, can receive the packets and identify a point-to-point connection (port) using a routing table and the destination address. The packet can be transmitted on the identified port so that it can be received by the next module in the transmission path.

Consistent with the various implementations discussed herein, one or more of the PCIe EP devices 424, 426 can be implemented using programmable ICs with a second configuration stage that uses DMA transfers to access secondary configuration data from main memory 416. In this manner, the CPU does not need to initiate each transfer as data can be accessed direction from memory through the root complex.

Figure 5:
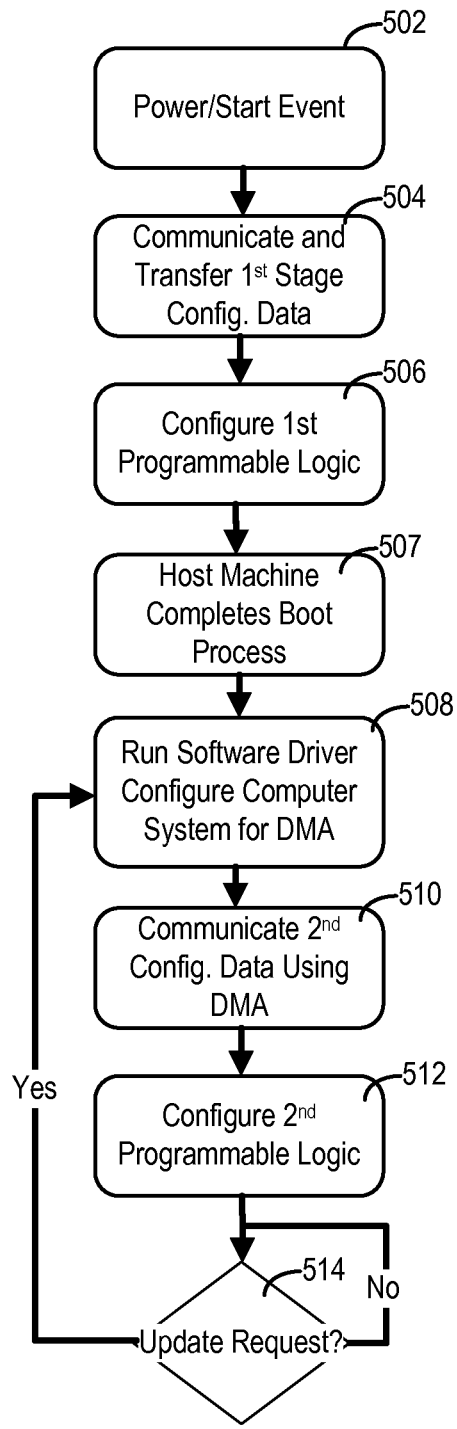
FIG. 5 depicts a flow diagram for use with a system for transferring configuration data using DMA, consistent with certain implementations.

FIG. 5 depicts a flow diagram for use with a system for transferring configuration data using DMA, consistent with certain implementations. The flow begins with the occurrence of a start event, per block 502. The start event can be (but is not limited to) power-up of the programmable IC and the host machine. For example, a system that uses PCIe may power the host machine and the PCIe endpoints from same power source, such that they are both brought up at nearly the same time. The host machine can release PCIe endpoints from reset and then expect the PCIe endpoints to be available within a set amount of time (e.g., 100 ms thereafter).

In response to the powerup/start event, the initial (first stage) configuration data can then be communicated to the programmable IC over a first stage programmable logic interface, per block 504. As discussed herein, this can include reading the configuration data from a non-volatile memory, such as a flash memory circuit, a PROM, or similar storage circuit. In certain implementations, the first stage bitstream loaded in block 506 can be kept relatively small so as to allow the configuration of the PCIe interface module within 100 ms after reset is released to the PCIe endpoint. Meeting this timing allows for the PCIe interface module to be enumerated without a subsequent reboot or reset.

The first stage configuration data is used to program a first portion of the programmable logic within the programmable IC, per block 506. This first portion can include a bus interface module. In particular implementations, the bus interface module can be a PCIe interface module designed to interface with a computer system and to appear to the computer system as a PCIe endpoint device.

The host machine (or SoC board) can carry out, and complete, its boot process, per block 507. The boot process can, for instance, include configuration of the endpoint devices and loading of the operating system. In PCIe, the configuration of the endpoint devices is sometimes referred to as enumeration. During enumeration, each PCIe endpoint device is detected and assigned an address space. Thus, if a particular PCIe endpoint device is not yet available when enumeration begins, it may not be assigned an address space. The host machine could be reset to allow enumeration to reoccur, but this can result in significant delays due to the extra boot time. As discussed herein, the PCIe specification allows for 100 ms between when the reset state is removed and when an endpoint should be available for enumeration. The use of a small $1^{st}$ stage configuration data can be particularly useful for meeting such requirements.

Once the host machine completes the boot process, the computer system can next execute or run a software driver that is configured to setup the computer system for DMA transfers that access second stage configuration data from the main memory of the computer system, per block 508. As discussed herein, the DMA engine can be located within the PCIe interface module of the programmable IC or within the PCIe root complex. In either situation, a software driver module, with runs on the host computer system, can configure the DMA engine and initiate the DMA transfers. This can include setting the PCIe DMA engine as a bus master and identifying a buffer address for the DMA transfers. The configuration of the DMA engine can include setting up a Buffer Descriptor chain that contains information about the buffer address and size of the DMA transfer for the second stage configuration data.

Once configured, the stage two configuration data can be transferred to the programmable IC using DMA transfers from the main memory of the computer system, as indicated by block 510. A second portion of the programmable logic can then be configured using the stage two configuration data, per block 512.

Consistent with some embodiments, the second portion of the programmable logic can be updated while the programmable IC is operating (e.g., after the second portion is programmed and without requiring shutting down and reconfiguration of the first portion of the programmable logic). The computer system can determine whether or not an update request has been received, per block 514. The update request might originate from an external location, such as over an Ethernet connection. This can allow, for example, remote updates to be pushed to programmable ICs over the Internet. If there is an update request, then the DMA transfer flow indicated by blocks 508 through 512 can be repeated for the new/updated second stage configuration data.

Figure 6:
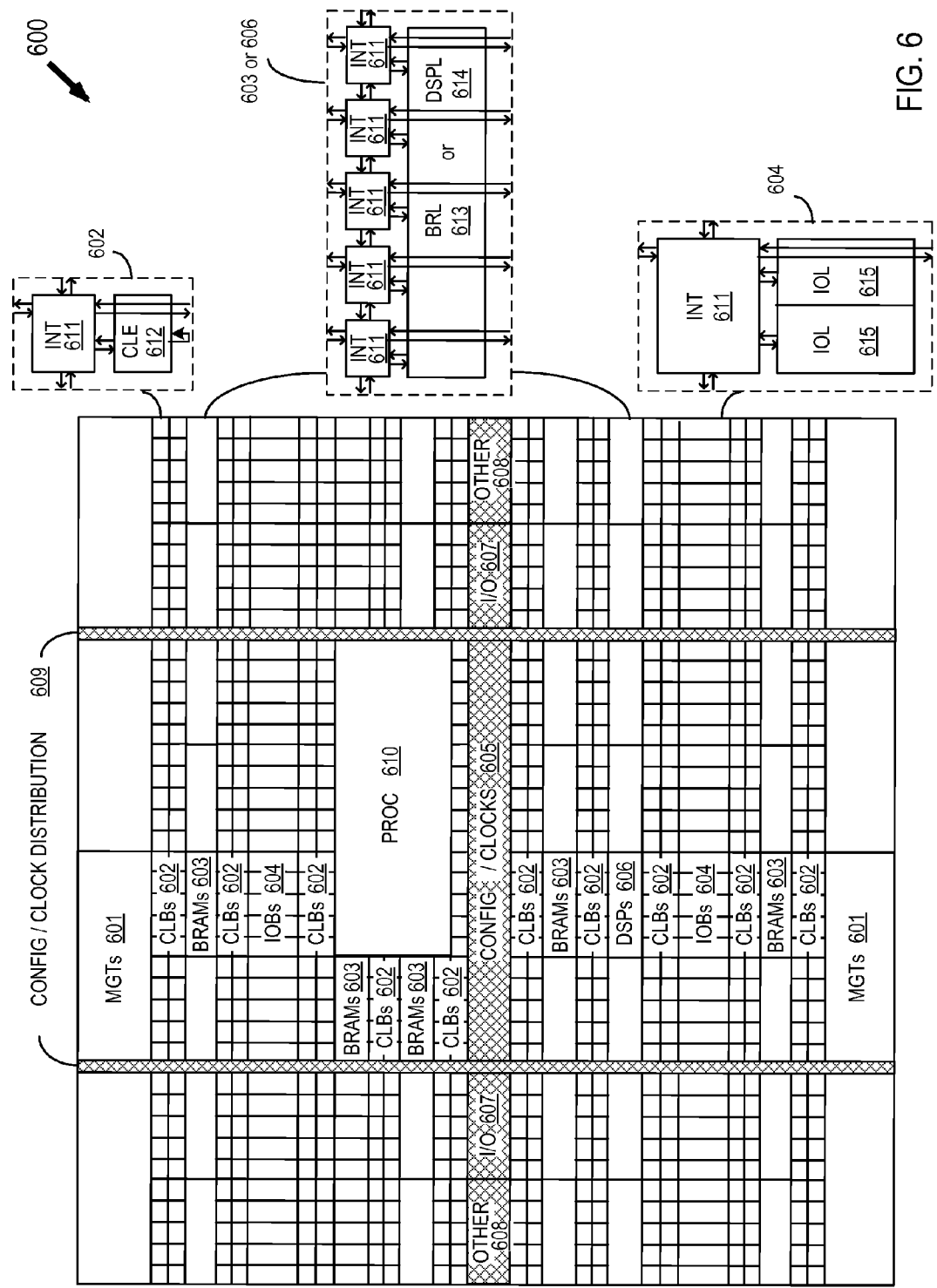
FIG. 6 shows a programmable integrated circuit (IC) on which the disclosed circuits and processes may be implemented.

FIG. 6 shows a programmable integrated circuit (IC) 600 on which the disclosed circuits and processes may be implemented. The programmable IC may also be referred to as a System-on-Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured implementation, a BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured implementation, a columnar area near the center of the die (shown shaded in FIG. 6) is used for configuration, clock, and other control logic. Horizontal areas 609 extending from the column are used to distribute the clock signal and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an example programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are merely an example. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures that may carry out functions disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems that use RAM circuits. Other aspects and features will be apparent to those skilled in the art from consideration of the specification. The portions of the methods and system may be implemented as one or more processors configured to execute software, as an application specific integrated circuit (ASIC), or as a logic on a programmable logic device. Moreover, the various circuits identified herein may share hardware circuitry, such as use a common computer processing unit or digital processing unit. It is intended that the specification and drawings be considered as examples only, with a true scope of the invention being indicated by the following claims.

What is claimed is:

1. A method for configuring a programmable integrated circuit (IC), the method comprising:
   communicating, using a storage interface circuit of the programmable IC, a first set of configuration data between a storage circuit and the programmable IC;
   configuring, using the first set of configuration data, the programmable IC to include:
      a bus interface module that is designed to interface with a host device over a communication bus that links multiple devices, and
      an internal configuration access interface that is designed to interface between the bus interface module and programmable logic of the programmable IC;
   communicating, using direct memory access (DMA) transfers through the bus interface module, a second set of configuration data between a main memory circuit and the programmable IC; and
   configuring, using the second set of configuration data, the programmable logic of the programmable IC.

2. The method of claim 1, wherein the bus interface module is further designed to interface with the host device using a packet-based protocol and over a point-to-point link between the host device and the programmable IC.

3. The method of claim 2, wherein the packet-based protocol defines packets that encapsulate data and specify a destination address.

4. The method of claim 1, wherein the configuring, using the first set of configuration data, the programmable IC further comprises configuring the programmable IC to include a DMA engine.

5. The method of claim 4, further comprising communicating, from the host device to the DMA engine, at least one read command for a particular location in a memory of the host device, wherein the particular location stores the second set of configuration data.

6. The method of claim 1, wherein the communicating, using direct memory access (DMA) transfers to the bus interface module, the second set of configuration data further includes configuring a root complex module of the host device to perform DMA accesses to a particular location in a memory of the host device, wherein the particular location stores the second set of configuration data.

7. The method of claim 2, wherein the method further comprises configuring a base address register of the bus interface module for DMA transfers.

8. The method of claim 2, wherein the method further comprises executing a software driver on a host device to communicate, using direct memory access (DMA) transfers through the bus interface module, the second set of configuration data.

9. The method of claim 2, wherein the method further comprises setting up a Buffer Descriptor chain that contains information about a buffer address register and size of the second set of configuration data.

10. A system comprising:
a programmable integrated circuit (IC) that includes:
a first interface circuit connected to a storage circuit and configured to receive configuration data from the storage circuit; and
a second interface circuit connected to a communication bus that links multiple devices; and
the storage circuit storing a first set of configuration data that, upon loading into the programmable IC through the first interface circuit, is configured to create:
a bus interface module that is designed to interface with a host device over the communication bus,
an internal configuration access interface that is designed to interface between the bus interface module and programmable logic of the programmable IC; and
a direct memory access (DMA) engine that is designed to communicate, using direct memory access (DMA) transfers through the bus interface module, a second set of configuration data between a main memory circuit and the programmable IC.

11. The system of claim 10, wherein the bus interface module is further designed to interface with the host device using a packet-based protocol and over a point-to-point link between the host device and the programmable IC.

12. The system of claim 11, wherein the packet-based protocol defines packets that encapsulate data and specify a destination address.

13. The system of claim 10, wherein the bus interface module includes a DMA engine.

14. The system of claim 13, wherein the DMA engine is configured to access main memory in response to receiving at least one read command that specifies a particular location in a memory of the host device and for the second set of configuration data.

15. A system comprising:
a programmable integrated circuit (IC) that includes:
a first interface circuit connected to a storage circuit and configured to receive configuration data from the storage circuit; and
a second interface circuit connected to a communication bus that links multiple devices;
the storage circuit storing a first set of configuration data that, upon loading into the programmable IC through the first interface circuit, is configured to create:
a bus interface module that is designed to interface with a host device over the communication bus, and
an internal configuration access interface that is designed to interface between the bus interface module and programmable logic of the programmable IC; and
a host device having a direct memory access (DMA) engine that is designed to communicate, using direct memory access (DMA) transfers and through the bus interface module, a second set of configuration data between a main memory circuit and the programmable IC.

16. The system of claim 15, wherein the bus interface module is further designed to interface with the host device using a packet-based protocol and over a point-to-point link between the host device and the programmable IC.

17. The system of claim 16, wherein the packet-based protocol defines packets that encapsulate data and specify a destination address.

18. The system of claim 15, wherein the host device is configured to communicate, to the DMA engine, at least one read command that specifies a particular location in a memory of the host device, and wherein the particular location stores the second set of configuration data.

19. The system of claim 15, wherein the DMA engine is part of a root complex device.

20. The system of claim 16, wherein the host device and the direct memory access (DMA) engine are configured to communicate the second set of configuration data using a software driver executing on a processor circuit of the host device.

* * * * *